Nov. 25, 1924.
J. H. PIFER
1,516,619
SCRAPER MECHANISM
Filed March 28, 1924
3 Sheets-Sheet 2
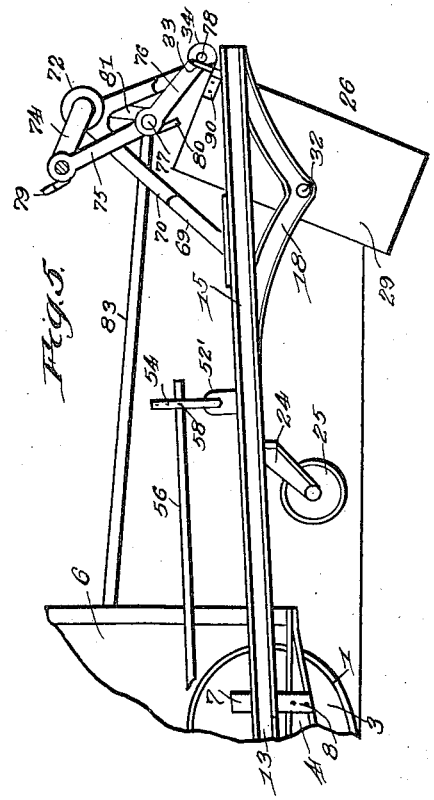

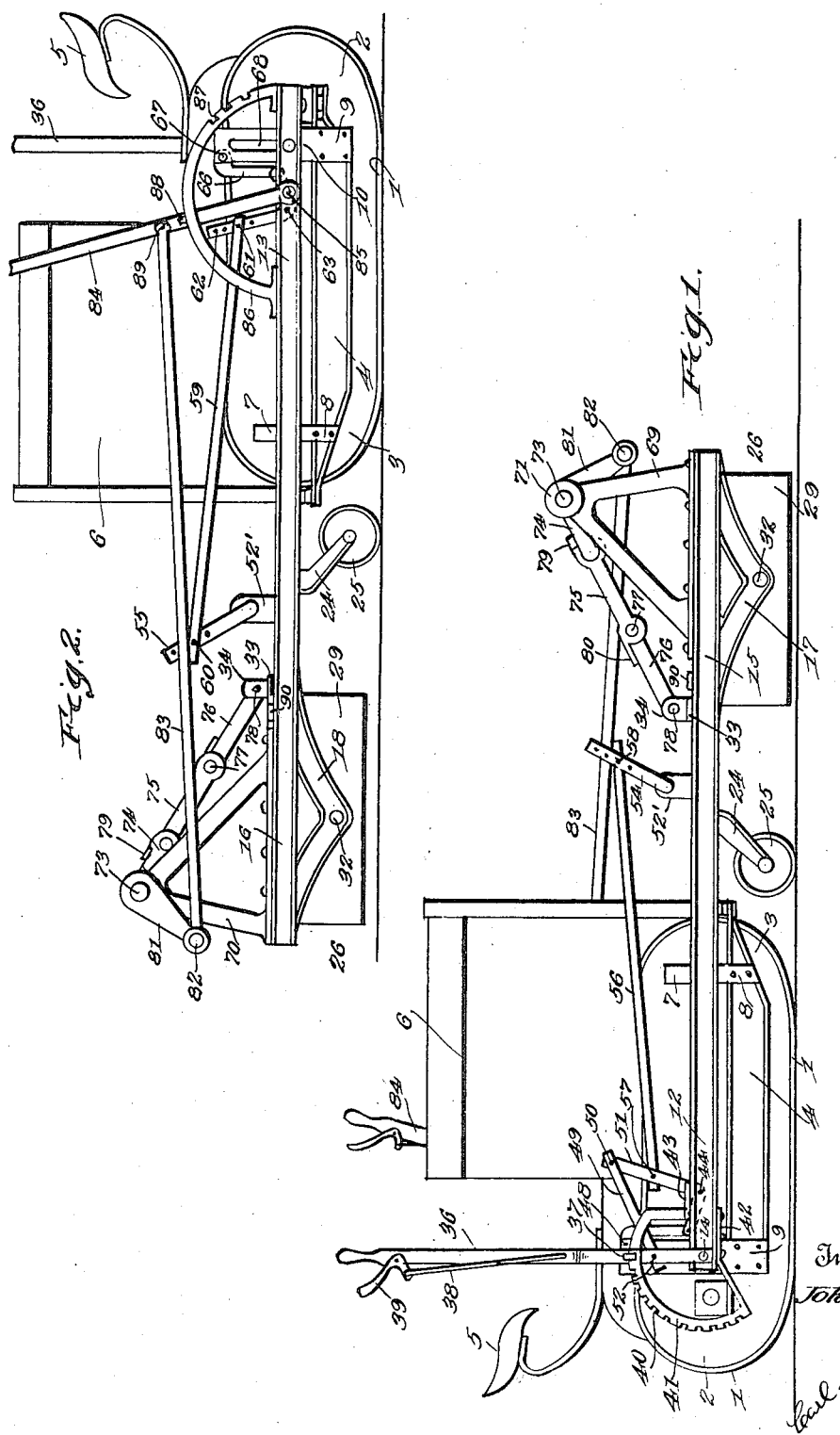

Nov. 25, 1924.  
J. H. PIFER  
1,516,619  
SCRAPER MECHANISM  
Filed March 28, 1924  3 Sheets-Sheet 3

INVENTOR  
John H. Pifer  
BY  
Carl H. Crawford  
ATTORNEY

Patented Nov. 25, 1924.

1,516,619

UNITED STATES PATENT OFFICE.

JOHN H. PIFER, OF LARIMORE, NORTH DAKOTA.

SCRAPER MECHANISM.

Application filed March 28, 1924. Serial No. 702,685.

*To all whom it may concern:*

Be it known that I, JOHN H. PIFER, a citizen of the United States, residing at Larimore, in the county of Grand Forks and State of North Dakota, have invented new and useful Improvements in Scraper Mechanism, of which the following is a specification.

The object of this invention is to provide an improved scraper mechanism.

Although my invention is not limited to any particular utility, it is especially designed for use in loose or soft dirt such as plowed ground. However, under some conditions, it may be employed to scrape and carry snow off from ice.

My invention embodies a frame structure which is preferably in the form of a push frame which is adapted to be advanced by a tractor with the frame extending forwardly of the former, a scraper being connected to the forward end of said frame.

One of the special features of novelty is to provide a tiltable frame with means for causing said frame to be tilted for the purpose of lowering or elevating the scraper during the scraping operation or at any other time.

In the most improved embodiment of my invention, I provide the push frame with one or more supporting wheels between the ends of said frame so that the tilting movement of said frame will be about said wheel or wheels as a fulcrum.

A further feature of novelty consists in means for selectively adjusting the scraper, during the scraping operation, irrespective of the position assumed by said scraper as a result of the adjustment of the push frame.

A further feature of novelty consists in providing such selectively adjusting means with provision whereby the scraper will normally be held rigidly in a fixed position, with respect to the push frame, irrespective of the adjustment of the latter, and whereby said selective means may, in addition, be employed to tilt the loaded scraper into engagement with the ground so that the advancing thrust of the tractor may be utilized to over-turn and dump the loaded scraper thereby relieving the operator of this effort.

In the most improved embodiment of my invention, the rear end of the push frame has lost motion or slotted engagement near the rear end of the tractor and the latter exerts its advancing thrust through such connection. Thus, it will be seen that an advancing connection between the tractor and push frame is always present irrespective either of the adjustment of the frame or its relative movement with respect to that of the tractor in traversing the ground or ice surface.

A special feature of novelty resides in mounting the frame adjusting means and also the selective means for the scraper, onto the push frame, whereby the latter and the tractor may freely assume different positions in traversing rough ground without in any way interfering with the adjustment of the frame and scraper.

My improved push frame is preferably forked to span the tractor, the forked ends extending rearwardly thereof to near the rear of the tractor, and it is also a feature to simultaneously apply adjusting thrust to both forked ends of said frame to thereby avoid twisting and binding stresses.

My invention has many other features and objects which will be more fully described in connection with the accompanying drawings and which will be more particularly pointed out in and by the appended claims.

In the drawings:—

Fig. 1, is a view in side elevation showing my improved scraper mechanism in a non-scraping or carrying position, and looking toward the right hand side of the mechanism.

Fig. 2, is a view with the mechanism in a similar position but looking toward the left hand side of the mechanism.

Fig. 3, is a view similar to Fig. 1, showing how the push frame has been tilted to dispose the scraper in a digging position, the selective means holding the scraper in fixed relation to said frame.

Fig. 4, is a partial view similar to Fig. 3, showing how the selective means may be employed to tilt the scraper into engagement with the ground just prior to dumping, and after the push frame has been restored to normal.

Fig. 5, is a view similar to Fig. 4, showing how advancing thrust of the tractor is employed to over-turn the scraper and dump the contents thereof.

Like characters of reference designate similar parts throughout the different figures of the drawings.

Figure 6:
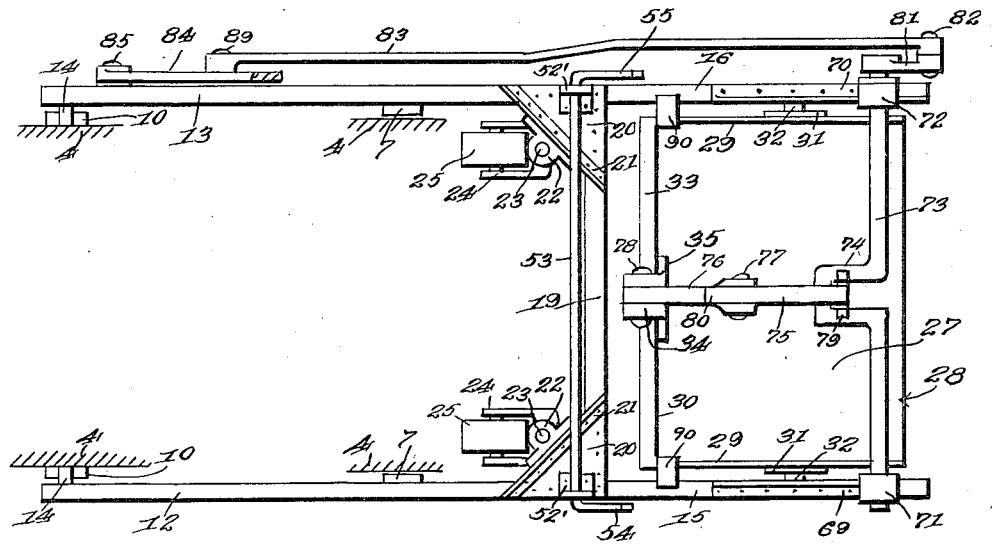
Fig. 6, is a plan view of the push frame with portions of the level mechanism omitted.
Figure 7:
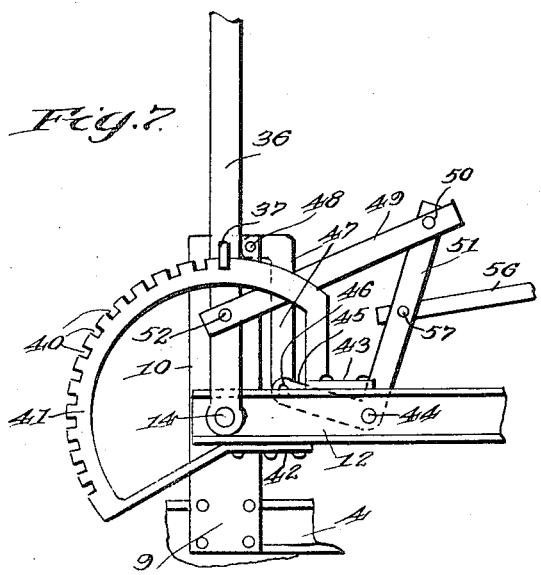
Fig. 7, is an enlarged view showing the lever mechanism on the right hand side of the machine for adjusting the push frame.
Figure 8:
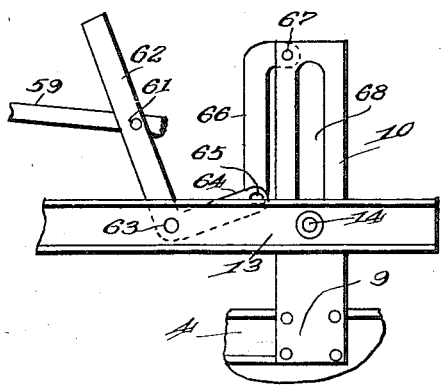
Fig. 8, is a similar view of the means on the left hand side.

In accordance with the specific form shown, I have disclosed a tractor of the caterpillar type having the usual tracks 1, trained about wheels 2 and 3, and a portion of the frame being indicated at 4. An operator's seat is shown at 5 and the housing for the engine at 6. There is secured on each side of the tractor frame an abutment bar 7 which is shown fastened to the frame 4, at 8, near the front end thereof. Near the rear end of frame 4, on each side of the tractor, there is secured at 9, a thrust plate 10, having a slot 11, extending vertically of said plate, as shown.

I will next describe my improved push frame which is more clearly shown in Fig. 6.

As illustrated, said frame is rearwardly and forwardly forked, the rearward forked ends 12 and 13 being adapted to extend laterally on opposite sides of the tractor toward and abreast of the thrust plates 10. A pivot bolt 14, connects each end 12 and 13 with its respective plate 10, on opposite sides of the tractor. Thus, it will be seen that the push frame is pivotally and slidably connected with the tractor whereby, to a limited extent, the rear portion of the frame may be tilted or swung upwardly or downwardly. It will be noted that the forked frame members 12 and 13, extend abreast of the abutment bars 7, and slide along the latter as the frame is tilted, so that the push frame will always be held in predetermined relation to the tractor. Thus, as the tractor is turned, the main thrust in correspondingly turning the push frame, will be sustained by the bars 7. The forwardly extending forked portion of the frame comprises forked ends 15 and 16. Said forked ends 15 and 16 have depending brackets 17 and 18 affording a means of connection thereto of a scraper, to be later described. A transverse member 19, extends across and unites the lateral frame members, heretofore referred to, into a rigid frame structure. In order to reinforce the structure, I preferably employ gusset plates 20, top and bottom, and which plates are riveted to the transverse and lateral members of the frame to stiffen the same. I also preferably employ angle iron 21, above and below, to form an extension whereto bearings 22, may be securely fastened. These bearings 22, form boxes for the shanks 23, of caster wheel brackets 24, in which wheels 25, are suitably journalled. These wheels, which broadly are swivelled to the push frame, form, in the present construction, a supporting means on which the push frame is tiltably mounted. However, irrespective of the particular means, I hereinafter claim, a push frame that is tiltably supported or mounted between its ends. In the particular construction shown, the caster wheels are of very particular advantage since they greatly facilitate the most abrupt turning of the push frame, and in addition, they swivel so freely, because of the leverage afforded by the trailing caster brackets 24, that they offer no resistance to turning or backing-up movement of the tractor, which is a matter of great importance to a mechanism of this character. I apply stress to the rearmost ends of the forked portions 12 and 13, to tilt the push frame, as will be later described in detail, and it will be noted that the wheels 25, are located nearer the front than the rear end of the push frame which disposition affords a leverage clearly to the advantage of the rear ends in obtaining tilting adjustment.

I will next describe the scraper and the manner in which the same is connected with the push frame and also such mechanism as may be employed to directly control the scraper.

I have shown a dirt form of scraper designated generally at 26, although it will be understood that a snow scraper may be with equal facility employed. This scraper has a bottom wall 27 provided with a front edge 28, side walls 29 and a back wall 30. The side walls 29, are suitably reinforced at 31, and are pivoted at 32, to the brackets 17 and 18. I find it a distinct advantage to dispose the pivotal connection 32 forwardly of a midway position as regards the side length of the scraper, and below the center of the side height of the same. This disposition of the pivotal connection not only causes the scraper to "dig in" and not tend to elevate the push frame and it also greatly facilitates the dumping operation, as will later appear. The rear wall 30, of the scraper, has a flange 33, on which a pivot block 34, rests. This block 34, has a depending flange 35, suitably secured to the rear wall 30, the purpose of which will later appear.

I will next describe the primary mechanism or means for adjusting the push frame to the desired tilt and thereby controlling the scraper.

A manually operable lever 36, is mounted on the right hand side of the machine on bolt 14. This lever 36 is equipped with the usual form of locking detent 37, operated by a rod 38 and a hand grip 39, the detent being adapted to engage notches 40, in a sector 41. The ends 42 and 43 of this sector are secured to forked end 12, and consequently move therewith. A bell crank lever is pivoted at 44, to end 12 and has a relatively short arm 45, pivoted at 46, to the lower end of a link 47. The upper end of said link 47, is pivoted at 48, to plate 10. A link 49, has one end pivoted at 50, to the longer arm 51, of said bell crank lever, the other end of said link being pivoted at 52, to hand lever 36.

Now it will be readily seen that when lever 36, is moved from the position shown in Fig. 1, to that of Fig. 3, the push frame will be tiltably adjusted to lower the scraper 26, into a "dig in" position, the depth being dependent upon the extent of movement imparted to lever 36.

In theory, the means on one side only, would be sufficient to adjustably tilt the push frame, but in practice, I prefer to apply tilting thrust to both sides of the push frame simultaneously, and by reason of the fact that connections could not be made transversely of the tractor, because of its height, I provide means extending about the tractor, which I will next describe.

Bearings 52', are mounted on opposite sides of the push frame and in these bearings is journalled a rock shaft 53. The ends of said shaft 53, are bent up to form rocker arms 54 and 55. A rod 56 has one end pivoted at 57, to bell crank arm 51, the other end being pivoted at 58, to arm 54. Thus, shifting movement of lever 36, is imparted to rock shaft 53. On the opposite side of the machine, a rod 59 has one end pivoted at 60, to rock shaft arm 55, the remaining end being pivoted at 61, to the longer arm 62 of a bell crank lever. Said bell crank lever is pivoted at 63 to forked end 13 and has a shorter arm 64, pivoted at 65, to a link 66, which latter is pivotally hung at 67, from plate 10. This plate 10 is likewise slotted at 68 to form a lost motion or slotted connection with forked end 13, by means of bolt 14.

As thus far described, I have disclosed a complete and operative entity, in combination with any kind of means for imparting dumping movement to the scraper. With the mechanism thus far described, I can lower the scraper into positions of different scraping depths to either quickly fill the scraper or slowly fill the same, and after the scraper is filled, I can elevate the same and carry the contents to a remote point of deposition. By reason of the fact that the distance between the axes of wheels 25 and bolts 14 is much greater than the distance between said wheel axes and bolts 32, it will be seen that the wheels 25 carry most of the load when the scraper is in the position shown in Fig. 1 or otherwise. Further, by connecting the push frame near the rear ends of the tractor, the latter's front end can tilt and rock to any extent, in traversing rough ground and only affect the position of the push frame and scraper to a minimum extent. It will also be noted that all of the mechanism for tilting the push frame, is located on said frame except the links 47 and 66, which, strictly speaking, are merely the means of connecting said tilting mechanism with the tractor and are therefore not a part of said mechanism.

I will next describe the improved means for holding the scraper in fixed relation to the push frame or selectively shifting the position of the scraper while it is being loaded, and finally, tilting the scraper into a dumping position.

On the forked ends 15 and 16, I mount bearing brackets 69 and 70 having bearings 71 and 72 in which is journalled a rock shaft 73. Said shaft 73 is provided with a crank 74, preferably between its ends although more than one crank may be added if desired. A link structure connects crank 74 with pivot block 34, and said structure may comprise a link 75 having one end journalled on crank 74, and its remaining end pivoted to link 76, at 77. The remaining end of link 76, is pivoted at 78, to pivot block 34. Link 75 has a lug 79, which overlaps the ends of crank 74, and the latter has a lug 80, which overlaps the right hand end of link 76. These lugs function to prevent the link structure from breaking joint in a downward direction, and consequently, this link structure acts as a strut, in Figs. 1, 2, and 3, to hold the scraper in fixed relation to the push frame. In other words, it acts as a retainer device. Thus, without any effort on the part of the operator, and when the parts described are in the normal position shown in said figures, the scraper can be controlled by tilting adjustment of the push frame by reason of the fact that the scraper is thus held in fixed relation thereto.

I will next describe the manner and means for actuating this link structure to either dump or selectively shift the position of the scraper with respect to the push frame.

The rock shaft 73 is provided with a crank arm 81, on the left hand side of the machine, and this crank arm is pivoted at 82, to a rod 83. A hand lever 84, is pivoted at 85, to the outside of forked end 13, and a sector 86, is mounted on said end 13 in concentric relation to pivot 85, and may be provided with notches 87. The lever 84, will be provided with a suitable locking device 88, for engagement with said notches. Said lever 84, is pivoted at 89, to the remaining end of rod 83. In order to relieve the link structure, and to limit swinging movement of the scraper beyond the position shown in Fig. 1, and to arrest it when it reaches the position shown in Fig. 5, I may, and preferably do equip the sides of the scraper with stops 90, one on each side wall 29. These stops may be L-shaped for engagement with the top faces of the forked ends 15 and 16, as clearly shown. However, I do not consider these stops essential in view of my novel link structure, in some embodiments of my invention.

I will next describe the operation of my improved mechanism.

The normal or starting position of the parts of this mechanism is shown in Figs. 1 and 2. The lever 36, is located on what I have termed the "right side" of the mechanism and the lever 84, is on the "left side". In these figures, the scraper is held fixed in the position shown. It is further noted, that when the scraper is to be operated by shifting the push frame, then, the lever 84 will not be locked to its sector 86, but will be free to take any position resulting from movement of the scraper by and as a result of adjusting the push frame. Now suppose the operator wanted a quick fill, then, he would adjust lever 36 into the extreme position shown in Fig. 3. By advancing the tractor, the scraper would very soon enter soft ground as shown in this figure and would be quickly filled. After the scraper had scooped a load of dirt, then, the operator would stop the tractor, if necessary and return the lever 36 to the position shown in Fig. 1, whereupon, the tractor could proceed to a distant point of deposition of the dirt. When such point of deposition had been reached, the operator would grasp lever 84, and shift the same rearwardly until the nose or edge 28, of the scraper entered the ground, on advancing movement of the tractor, as shown in Fig. 4. This would only require a slight exertion on the part of the operator compared to what would be required to completely overturn the scraper. Now after the scraper has reached the position shown in Fig. 4, it is merely necessary to advance the tractor whereupon the push frame will fulcrum on pivots 32, as shown in Fig. 5, raising the frame, and forcing the scraper to overturn on its edge 28, until it is in such a position that the contents of the scraper will be completely discharged. It will be noted from Fig. 4, that just as soon as lever 84, has been thus shifted, the crank 74 will break the first joint of the link structure and up to this point in the operation, the links will be under tension. After the tractor has been started, the operator releases, or may release his left hand from lever 84, as the movement of the scraper into the position shown in Fig. 5, will be automatic. The stop 90, will engage the push frame to limit further movement of the scraper. Now it will be clear that the stop 90, is not essential, as the operator can tell when the scraper has reached a dumping position and can then stop the tractor. In order to return the scraper to a normal or receiving position, as shown in Fig. 1, the operator will back up the tractor from the position shown in Fig. 5, and the scraper will resume the position shown in Fig. 4, and on further backing up, the scraper will resume the position shown in Fig. 1, with the link structure automatically returned to a retaining position. In the normal position, the stop 90, functions to restrain the scraper against movement in excess of the position shown in Fig. 1, thereby allowing the link structure to pass over a dead center with the locking lugs 79 and 80 in active engagement with succeeding links. During this return movement of the scraper, the lever 84 is free to float back and assume a position in accordance with the position of the scraper. That is why the sector 86, is blank, or not provided with notches except near its rear portion. It will also be clear that the pivots 32, are so located with respect to the scraper that the latter will, after turning back toward a normal position to a certain extent, complete its further movement by gravity. During backing-up movement of the tractor, the castor wheels 25, will swivel in their bearings and conform to any backing-up as well as any turning movement of the tractor.

It will be noted that I have thus far described and developed the function of the push frame, and its adjustability, together with the secondary or selective means, with the latter employed solely to retain and dump the scraper. However, this selective means is capable of additional functions which I will now describe.

Suppose the push frame was adjusted into a digging posture to a less extent than that shown in Fig. 3, and it was desired to slightly change the position of the scraper, to and fro, to alter the scraping depth, then, without changing lever 36, the operator could grasp lever 84, and selectively alter the position of the scraper as desired. If the scraper struck an obstruction, it could thus quickly be adjusted into a scraping position of a lesser depth until the scraper passed over the obstruction. Or, in a smoothing off job the scraper could be quickly adjusted to not only scrape but substantially level off the surface.

It is desired to emphasize the feature of mounting the scraper on the push frame so that the latter is elevated off from ground engaging support, as in Fig. 5, not only because this feature relieves the operator of the exertion of completely dumping the scraper, but for the further reason that by backing up, the scraper can be returned to a normal position without the necessity of springs or other return or assistant returning device, and wholly under power of the tractor.

In the foregoing description, I have shown how the selective means may be employed wholly as a selective means, and not as a fixed means. I will next develop the utility of the notches 87, in the sector 86, and will show the advantage of using the selective means as a fixed means.

Suppose the mechanism were to be used in scraping a portion of the top of snow from an ice surface, then, the lever 84 might be adjusted back from the position shown in Fig. 2, into engagement with a notch that would cause the scraper to "dip" so that its forward edge 28, would be, say, one inch above the ice surface, the push frame being in the normal position shown in said figure. This posture of the scraper would avoid the resistance that would result if the push frame was lowered to a like position and wherein the bottom of the scraper would slide along and pack the snow. A like fixed adjustment of the selective lever 84, might with equal advantage be employed in skimming along the surface of a road or graded street, to level the same.

While many other utilities are obviously possible, it is believed that my invention will be clearly understood from the foregoing description, and while I have shown and described one embodiment of my invention, I do not wish to be limited thereto, except for such limitations as the claims may import.

I claim:—

1. A scraper mechanism comprising, a frame structure tiltably supported between its ends adapted to be advanced and having front ends in lateral spaced relation, and a scraper disposed between said front ends and connected with said structure to be advanced thereby.

2. A scraper mechanism comprising, a frame structure tiltably supported between its ends, means connected with the rear end to advance said structure, and a scraper connected with the front end of said structure.

3. A scraper mechanism comprising, a frame structure tiltably mounted between its front and rear ends, a scraper connected with the front end of said structure, a traction engine connected with the rear end of said structure, and means for tiltably adjusting said structure to control said scraper.

4. A scraper mechanism comprising, a frame structure tiltably mounted between its ends, means connected with the rear end of said structure to advance the latter, a scraper connected with the front end of said structure, means for tiltably adjusting said structure to control said scraper, and means connected with said scraper for controlling the latter.

5. A scraper mechanism comprising, a frame structure tiltably supported between its ends, a scraper connected with the front end of said structure, a traction engine having slotted connection with the rear end of said structure to advance the latter, and lever mechanism on said frame and connected with said engine for adjusting said structure from the rear end thereof to control said scraper.

6. A scraper mechanism comprising, a traction engine, a push frame tiltably supported between its ends extending forwardly of and having its rear end movably connected with said engine, a scraper connected with the front end of said frame, and means carried by said frame for manipulating said scraper irrespective of the relative positions of said frame and engine.

7. A scraper mechanism comprising, a push frame having supporting wheels between the ends thereof, a traction engine connected with the rear end of said frame rearwardly of said wheels to advance said frame, and a scraper connected with the front end of said frame and disposed forwardly of said wheels.

8. A scraper mechanism comprising, a push frame having a supporting wheel between its ends on which said frame can be tilted, and a scraper on the front end of said frame in advance of said wheel.

9. A scraper mechanism comprising, a push frame having a supporting wheel between its ends on which said frame can be tilted, a scraper on the front end of said frame in advance of said wheel, means connected with the rear end of said frame to advance the same, and means for tilting said frame to control said scraper.

10. A scraper mechanism comprising, a tractor, a push frame having its rear end in thrust advancing and pivotal connection with said tractor, a scraper pivoted to the front end of said push frame, a supporting wheel for said push frame disposed rearwardly of said scraper, and the pivotal connection of said scraper with said frame being located to cause said scraper to elevate said frame off from supported engagement with the ground when said scraper is in a dumping position.

11. A scraper mechanism comprising, a push frame adapted to be advanced, a scraper connected with the front end of said frame, and jointed link means acting automatically for retaining said scraper in fixed relation with said frame.

12. A scraper mechanism comprising, a push frame adapted to be advanced, a scraper connected with the front end of said frame, jointed link means acting automatically for holding said scraper in fixed relation with said frame, and mechanism for actuating said link means to tilt said scraper with respect to said frame.

13. A scraper mechanism comprising, a tractor, a tiltable push frame rearwardly forked and spanning said tractor laterally thereof and having its forked end in lost motion connection with said tractor, a scraper connected with the front end of said frame, and lever mechanism operable on one side of said tractor and extending about and to the remaining side of said tractor for simultaneously shifting both forked ends of said frame to tilt the latter.

14. A scraper mechanism comprising, a frame, a scraper pivoted to said frame, a jointed link structure normally locked against movement beyond dead center and acting under compression to hold said scraper in fixed relation to said frame, and means for placing said structure under tension to rock said scraper.

15. A scraper mechanism comprising, a frame having rearwardly and forwardly disposed forked portions and a transverse member between said portions, a scraper pivoted in the forward forked portion, and caster wheels for supporting said frame and swivelled to said transverse member to swing about vertical axes rearwardly of said scraper.

In testimony that I claim the foregoing as my own, I hereby affix my signature.

JOHN H. PIFER.